June 12, 1934.  R. S. TOUR  1,962,849
INDICATING METER
Filed May 25, 1932
*Fig 1.*
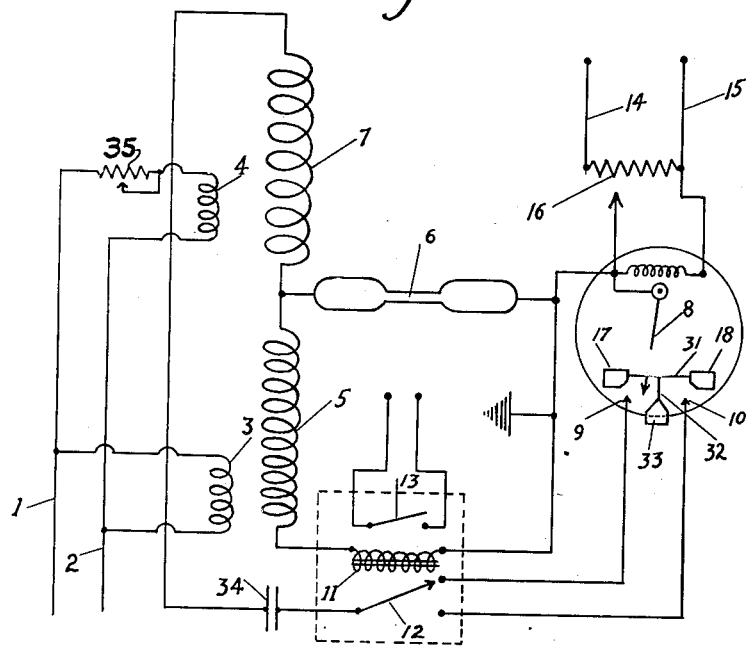
*Fig 2.*
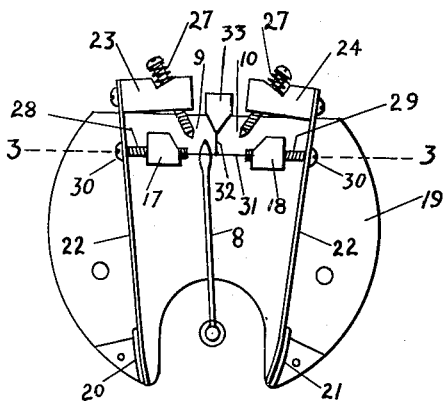
*Fig 4.*
*Fig 3.*
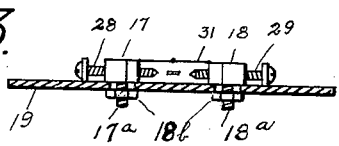
Inventor
Reuben S. Tour
By Arthur H. Ewald
Attorney.

Patented June 12, 1934

1,962,849

UNITED STATES PATENT OFFICE 1,962,849

INDICATING METER

Reuben S. Tour, Cincinnati, Ohio

Application May 25, 1932, Serial No. 613,585

32 Claims. (Cl. 171—95)

My invention relates to improvements in meters otherwise of standard construction for use as indicating devices or in the actuation of electrical relays, serving to make the action of said meters more sensitive. It is broadly applicable to meters of the type where the motion of a pointer or other movable member indicates variation in the quantity being measured, whether that quantity be electrical current, voltage, temperature, pressure or other characteristic. In this specification the construction and function of the invention is described as applied to the actuation of an electrical relay for "on or off", or "step by step" current regulation which relay, in turn, may be used to operate any external mechanical or electrical device for the purpose in hand, but said invention is not limited to such application.

For the purposes of this specification, meters will include any device in which the motion of a pointer, needle or arm indicates a variation in the extent or magnitude of some external force or quantity, whether or not the device is arranged for quantitatively measuring this variation. A standard form of meter, whether it be for indicating electrical or mechanical quantities or forces, consists generally of a pointer, motivated by some mechanism designed to move the pointer with a variation in the quantity being measured. The motion of this pointer is usually resisted by springs or other counter-forces which tend to maintain the pointer at some definite zero position when there is no motivating force applied and to maintain the pointer stable when displaced against the counter-forces by the motivating mechanism. The force available from the mechanism when moving the pointer must be sufficient to overcome the spring or other resistance to displacement within the device, the amount of displacement of the pointer from its zero position being that necessary to equalize the motivating force against the resisting counter-forces. However, my invention may be applied as well to meters in which the pointer occupies a position dictated solely by the magnitude of the quantity measured and free from other constraint except friction. This invention consists broadly in superimposing on the pointer of the above simple system other forces of such character and in such location that a slight initial displacement of said pointer, caused by the motivating mechanism, will bring it into such relation with the superimposed forces that the latter will increase greatly the first slight displacement of the pointer.

More specifically my invention superimposes a shielded electrostatic field of force on the simple system of forces in any standard indicating meter. If an electrified terminal or conductor exerting electrostatic attraction be placed near the pointer in such relative position as to tend to displace the pointer, although not to interfere with its motion in its arc of travel, this electrostatic attraction will serve to neutralize the effect of the springs holding the pointer in its zero or other position of balanced and equalized forces. By a proper placing of this electrified terminal and by a proper shielding or grounding of the electrostatic field of force about the terminal and the pointer, the electrostatic force effective on the pointer may be made sufficient almost completely to neutralize the spring or resisting force within the meter, yet leave just enough resisting force to hold the pointer stationary or "static" at some predetermined position of balance of forces. In this condition, any slight displacement of the pointer toward the terminal will increase the electrostatic pull enormously, and the internal resisting force being then completely overcome the pointer will swing as far as it may toward the electrified terminal. In this way, the system as a whole can be made as sensitive as desired by properly placing the electrified terminal, the electrostatic shielding, and the pointer, each with respect to the other; in fact, the possible sensitivity attainable is limited only by the internal friction to motion of the pointer mechanism.

In these specifications and claims, the "static" position of the pointer will be understood to mean that position in which all the forces including electrostatic attraction acting on the pointer are balanced and no pointer motion occurs. The electrostatic pull on the pointer in "static" position is insufficient to displace the pointer. Should the pointer be moved from this static position by the motivating mechanism, the forces become unbalanced and immediate motion occurs in the direction of the predominating force.

If two electrified terminals be placed one on each side of the pointer, the sensitivity described above may be obtained for pointer deflection in either direction. Further, if these terminals are so placed with respect to the arc of travel of the pointer that the latter will just clear them in its motion, but pass closely enough to permit intersparking between the electrified terminal and the pointer, such spark may be used to operate an electrical relay, a recording instrument, or other desired device, the relay or device being of special design so that it will be responsive to the passing of such a spark to the pointer.

In a co-pending application filed by Laurence R. Culver and myself as joint inventors on the 21st day of March, 1932, Serial No. 600,170, there is disclosed an electrical relay, comprising a work circuit including a gas discharge tube, said work circuit being supplied by an E. M. F. too low to effect ionization in said tube, and a control circuit supplied with a comparatively high E. M. F. and including a switch and spark-gap for imposing an electric surge or surges on the work circuit so as to discharge the tube, thus completing the work circuit. The present invention of a sensitized meter arranged for sparking at the pointer-end may be used as an actuating device in the type of relay described in said joint application, and has for its specific purpose therein the provision of a unitary structure wherein the pointer of the meter is adapted to serve as the moving switch-arm and spark-gap in the control circuit of the relay.

My invention thus provides for the above or a similar electrical relay, an actuating device of such high sensitivity that the apparatus or equipment controlled by the relay may be maintained between extremely narrow limits of variation of its characteristic function. My sensitized meter as above explained calls for an actuating force from the pointer-moving mechanism merely sufficient to initiate movement of the pointer from its zero or static position, and thereafter utilizes an electrostatic pull for completing the movement of the pointer to a sparking position. It is thus possible to provide a relay sensitivity of almost unlimited degree, the real work of operating the relay switch-arm and setting a spark gap being performed by the electrostatic forces acting on the pointer.

As presently embodied in the aforesaid electrical relay, my invention consists of a galvanometer or other metering device, the pointer of which is sensitized by and arranged to cooperate with electrified sparking terminals, the action of said pointer being stabilized by means of properly shielding or grounding the electrostatic field about the sparking terminals and the pointer. As preferably designed, the sparking terminals are made adjustable just outside the arc of travel of the pointer-end, and the electrostatic shielding is so disposed, arranged and adjusted about the terminal and pointer that at the zero position of the pointer, there is an equilibrium of forces and the spring torque resisting the displacement of the pointer from zero is nearly neutralized by the attractive forces of the electrostatic field. An extremely slight motivating force applied to the pointer will move it from its shielded or stable static position into the field of electrostatic attraction of a spark terminal. Thus, a motivating force on the pointer ordinarily sufficient to cause only a slight displacement thereof against normal resistance, will bring the pointer under the influence of an electrostatic force sufficient to cause pointer movement of large magnitude, enough to move the pointer into sparking relation with the terminal even when this terminal is located at a sufficient distance from the static pointer position to assure safety from undesirable sparking.

In the drawing:

Figure 1 is a schematic diagram of an electrical relay constructed to operate in conjunction with this invention.

Figure 2 is a plan view of the meter face equipped with sparking terminals and electrostatic shielding, as specified in this invention.

Figure 3 is a section on line 3—3 of Figure 2.

Figure 4 is a plan view of another form of this invention.

In the diagram of Figure 1, the numerals 1 and 2 indicate alternating current supply leads to which are connected primary coils 3 and 4 respectively of the work circuit and control circuit transformers. The secondary coil 5 of the work circuit transformer is arranged to supply an E. M. F. of approximately 250 to 350 volts, too low to initiate ionization of the gas discharge tube 6, included in the work circuit. Secondary coil 7 of the control circuit transformer is arranged to supply a potential of approximately 1500 to 2000 volts. The pointer 8 of a galvanometer or other form of meter is connected in the control circuit, as are also the sparking terminals 9 and 10 which are mounted on the meter face in proper relation to the arc of travel of the pointer-end. Included in the work circuit is the coil 11 of a ratchet relay which operates simultaneously both as a pole-changing switch 12 to electrify alternately the spark terminals 9 and 10, and a switch 13 for an external power relay of the latch type. The pointer 8 will, of course, be motivated in the usual manner by variations in the operation of the controlled apparatus either by electrical or mechanical forces according to the type of meter used and the purpose to be served.

As illustrated in Figure 1, my improvement is used on a galvanometer which is operated by an actuating circuit supplied through leads 14 and 15. Mounted on the face of the meter and grounded thereon are shielding metallic blocks 17, 18 and 33, and shielding wires 31 and 32, so placed with respect to the sparking terminals and pointer-end as to shield and neutralize the electrostatic field at the zero or static position of the pointer so that the attractive force of the electrified terminal will just fail to overcome the torque holding the pointer at this static position. In order properly to adjust and control the electrostatic field so as to stabilize the operation of the pointer 8, the sparking terminals are preferably made fully adjustable in position with reference both to the pointer and the shielding masses, the latter being also preferably independently adjustable on the meter face.

In Figure 2, I have shown in more detail the construction on the meter face indicating also the means of adjusting the positions of the shielded terminals. There are secured to a grounded metallic meter face 19, flanges 20 and 21, to each of which is secured a flat spring arm 22, said springs extending across the face of the meter along both sides of the pointer. Secured to the free end of each of the springs, considerably beyond the arc of travel of the pointer-end, are non-conductive blocks 23 and 24 through which the sparking terminal pins 9 and 10 are threaded. Coil springs 27 maintain the pins 9 and 10 in desired adjustment. Adjustably fastened on meter face 19 by means of studs 17—a and 18—a extending through slots in the meter face are two shielding blocks 17 and 18, the adjustments being secured by nuts 18—b threaded on the studs. Threaded through the shielding blocks 17 and 18 are screws 28 and 29 which extend through slots in the respective flat springs 22, the heads 30 of said screws serving as abutments to retain the springs and with them the sparking terminals 9 and 10 in any desired adjustment with respect to the zero or static axis of the pointer 8, while the other ends of the screws project through the shielding blocks and serve as stops for the pointer when it swings into sparking position. The shielding blocks 17 and 18 are interconnected by means of a wire 31 which extends over the pointer, and the mid portion of said wire is connected by wire 32 with another shielding block 33 located just outside the arc of the pointer but along its static axis. These wires serve to ground the electrostatic field above the pointer and along its static axis, while block 33 further stabilizes the pointer in its static position.

In Figure 4 is shown another construction for my invention. Mounted on the metallic meter face 19 are two shielding blocks 17 and 18, adjustably held in place by threaded studs extending through slots in the meter face. Threaded through the shielding blocks are screws 28 and 29, the ends of which project through the shielding blocks and serve as stops for the pointer when it swings into sparking position. Secured to the shielding blocks are non-conductive blocks 23 and 24 through which the sparking terminal pins 9 and 10 are threaded and so adjusted that they are just beyond the arc of travel of the end of pointer 8. Coil springs 27 maintain the pins 9 and 10 in desired adjustment. Just beyond the pointer arc of travel and along the static axis of the pointer a wire 32 which is bent over the top of the pointer along the static axis rises from the meter face. This wire 32 serves especially to neutralize the electrostatic field in the static position of the pointer.

The sensitivity of operation may be controlled further either by means of a potentiometer 16 or other device in the actuating circuit 14—15, or by means of a rheostat 35 in the primary of the control circuit.

In operation, when the position of pole-changing switch 12 is as shown in Figure 1, and when the operation to be controlled affects the actuating circuit 14—15 so as to cause even an extremely slight movement of the pointer 8 from its shielded position toward electrified terminal 9, said pointer is brought by such deviation increasingly within the attractive electrostatic field of force of the terminal; this increased electrostatic force then continues the movement of the pointer until a spark is produced between the pointer-end and terminal 9 in the high potential control circuit comprising secondary transformer winding 7, gas discharge tube 6, pointer 8, terminal 9, switch 12 and condenser 34, the latter being included in the control circuit primarily as a current limiting impedance to prevent destructive sparking between the pointer-end and sparking terminals. The electrical surge on the tube 6 caused by the spark at 9 ionizes the tube and permits the flow of current through the work circuit supplied by secondary coil 5 through ratchet relay coil 11 and tube 6. The coil 11 operates the external relay switch 13 of a power circuit and simultaneously throws the pole-changer over to electrify the other sparking terminal 10. Terminal 9, being out of the circuit, no longer attracts the pointer which returns to its zero or static position. Subsequent sparking between the pointer 8 and terminal 10, similarly initiated by circuit 14—15 operates in the same manner reversing the movements of the relay switches 12 and 13.

It will be understood that while I have shown this spark-operated relay in connection with the pointer of a galvanometer it may be constructed in connection with any other type of meter while the relay itself may be designed for either "on or off" or "step by step" power control. It will also be apparent that the sensitivity of the meter may be increased practically without limit by so locating the sparking terminals and grounded shielding with respect to the pointer-end that the tendency of the pointer toward its zero or static position is neutralized to a degree just short of permitting uncontrolled movement of the pointer. The external force necessary on the pointer in order to produce operative displacement sufficient to bring said pointer under the electrostatic control of the electrified terminal may thus be so reduced as to bring about a sensitivity of response to the external conditions being controlled not hitherto attainable, while at the same time proper shielding makes the operation of the pointer entirely stable.

It will be noted that actuation of the relay using my invention as above described does not depend on the making and breaking of contacts with the inherent difficulties of variable contact resistance, but depends on the passing of a spark through an air gap. It will also be observed that by reason of the low current required for the operation of the control circuit, destructive sparking between the pointer-end and terminals is wholly eliminated. And, further, my invention makes available a relay sensitivity hitherto unattainable with such simple mechanisms and devices.

Having thus fully described my invention, what I claim as new and desire to secure by Letters Patent is:

1. A metering instrument comprising in combination with an electrically conductive pointer, an electrified terminal so located with respect to the pointer that the electrosatic field about the terminal will attract the pointer and increase its sensitivity to displacement, and means for shielding the electrostatic field about the terminal and pointer in order to stabilize the pointer at a predetermined neutral static position.

2. A metering instrument comprising in combination with an electrically conductive pointer, an electrified terminal, means whereby said terminal is adjustably mounted with respect to the pointer so that the electrostatic field about the terminal will attract the pointer and increase its sensitivity to displacement, and adjustable means for shielding the electrostatic field about the terminal and pointer in order to stabilize the pointer at a predetermined neutral static position.

3. A metering instrument comprising in combination with an electrically conductive pointer arranged to rest normally in a predetermined static position, two terminals placed one on each side of said static position, each of said terminals being so located that when electrified, its electrostatic field of force will attract the pointer and increase its sensitivity to displacement from its static position.

4. A metering instrument comprising in combination with an electrically conductive pointer arranged to rest normally in a predetermined static position, two terminals placed one on each side of said static position, each of said terminals being so located that when electrified, its electrostatic field of force will attract the pointer and increase its sensitivity to displacement from its static position, and means for shielding the electrostatic field about the terminals and pointer in order to stabilize the pointer at its static position.

5. A metering instrument comprising in combination with an electrically conductive pointer arranged to rest normally in a predetermined static position, two terminals adjustably mounted one on each side of said static position, each of said terminals being so located that when electrified, its electrostatic field of force will attract the pointer and increase its sensitivity to displacement from its static position, and adjustable means for shielding the electrostatic field about the terminals and pointer in order to stabilize the pointer at its static position.

6. A metering instrument comprising in combination with an electrically conductive pointer arranged to rest normally in a predetermined static position, a sparking terminal adapted to be electrified and so located with respect to the said static position that when electrified it will electrostatically attract and move said pointer into sparking relation with itself when the pointer has been slightly displaced from its static position toward said terminal by a small variation in the quantity being metered.

7. A metering instrument comprising in combination with an electrically conductive pointer arranged to rest normally in a predetermined static position, a sparking terminal adapted to be electrified and so located with respect to the said static position that when electrified it will electrostatically attract and move said pointer into sparking relation with itself when the pointer has been slightly displaced from its static position toward said terminal by a small variation in the quantity being metered, and means for shielding the electrostatic field of attraction about the terminal and pointer to stabilize the pointer at its static position.

8. A metering instrument comprising in combination with an electrically conductive pointer arranged to rest normally in a predetermined static position, an adjustably mounted sparking terminal adapted to be electrified and so located with respect to the said static position that when electrified it will electrostatically attract and move said pointer into sparking relation with itself when the pointer has been slightly displaced from its static position toward said terminal by a small variation in the quantity being metered, and adjustably mounted means for shielding the electrostatic field of attraction about the terminal and pointer to stabilize the pointer at its static position.

9. A metering instrument comprising in combination with an electrically conductive pointer arranged to rest normally in a predetermined static position, two sparking terminals each adapted to be electrified and placed one on each side of said static position, and each being so located that when electrified it will electrostatically attract and move said pointer into sparking relation with itself when the pointer has been slightly displaced from its static position toward said electrified terminal by a small variation in the quantity being metered.

10. A metering instrument comprising in combination with an electrically conductive pointer arranged to rest normally in a predetermined static position, two sparking terminals, each adapted to be electrified and placed one on each side of said static position and each being so located that when electrified it will electrostatically attract and move said pointer into sparking relation with itself when the pointer has been slightly displaced from its static position toward said electrified terminal by a small variation in the quantity being metered, and means for shielding the electrostatic field of attraction about the terminals and pointer to stabilize the pointer at its static position.

11. A metering instrument comprising in combination with an electrically conductive pointer arranged to rest normally in a predetermined static position, two sparking terminals each adapted to be electrified and being adjustably mounted one on each side of said static position, and each being so located that when electrified, it will electrostatically attract and move said pointer into sparking relation with itself when the pointer has been slightly displaced from its static position toward said electrified terminal by a small variation in the quantity being metered, and adjustably mounted means for shielding the electrostatic field of attraction about the terminals and pointer to stabilize the pointer at its static position.

12. In a control circuit for an electrical relay, an electrically conductive indicating pointer connected in said control circuit and arranged to be actuated by the varying conditions that are to operate the relay, and a sparking terminal in said circuit and so located with respect to the pointer that said pointer may be moved into sparking relation therewith, whereby the electrostatic field of force between terminal and pointer is adapted to increase the sensitivity of the pointer-moving mechanism to displacement forces.

13. In a control circuit for an electrical relay, an electrically conductive indicating pointer connected in said control circuit and arranged to be actuated by the varying conditions that are to operate the relay, a sparking terminal in said circuit and so located with respect to the pointer that said pointer may be moved into sparking relation therewith, whereby the electrostatic field of force between terminal and pointer is adapted to increase the sensitivity of the pointer-moving mechanism to displacement forces, and means for shielding the electrostatic field about said terminal and pointer to stabilize the pointer at a predetermined neutral static position.

14. In a control circuit for an electrical relay, an electrically conductive indicating pointer connected in said control circuit and arranged to be actuated by the varying conditions that are to operate the relay, a sparking terminal adjustably mounted in said circuit and so located with respect to the pointer that said pointer may be moved into sparking relation therewith, whereby the electrostatic field of force between terminal and pointer is adapted to increase the sensitivity of the pointer-moving mechanism to displacement forces, and adjustable means for shielding the electrostatic field about said terminal to stabilize the pointer in predetermined neutral static position.

15. In a control circuit for an electrical relay, an electrically conductive indicating pointer connected in said control circuit and arranged to be actuated by the varying conditions that are to operate the relay, said pointer being adapted to rest normally in a predetermined static position, two sparking terminals in said circuit, one on each side of said static position, each of said terminals being so located that said pointer may be moved into sparking relation therewith, and that the electrostatic field of force between either terminal and the pointer is adapted to increase the sensitivity of the pointer-moving mechanism to displacement forces.

16. In a control circuit for an electrical relay, an electrically conductive indicating pointer connected in said control circuit and arranged to be actuated by the varying conditions that are to operate the relay, said pointer being adapted to rest normally in a predetermined static position, two sparking terminals in said circuit one on each side of said static position, each of said terminals being so located that the pointer may be moved into sparking relation therewith, and that the electrostatic field of force between either terminal and the pointer is adapted to increase the sensitivity of the pointer-moving mechanism to displacement forces, and means for shielding the electrostatic field about said terminals and pointer to stabilize the pointer at its static position.

17. In a control circuit for an electrical relay, an electrically conductive indicating pointer connected in said control circuit and arranged to be actuated by the varying conditions that are to operate the relay, said pointer being adapted to rest normally in a predetermined static position, two sparking terminals adjustably mounted in said circuit, one on each side of said static position, each of said terminals being so located that the pointer may be moved into sparking relation therewith, and that the electrostatic field of force between either terminal and pointer is adapted to increase the sensitivity of the pointer-moving mechanism to displacement forces, and adjustable means for shielding the electrostatic field about said terminals and pointer to stabilize the pointer at its static position.

18. In a control circuit for an electrical relay, an electrically conductive indicating pointer connected in said control circuit and arranged to be actuated by the varying conditions that are to operate the relay, said pointer being adapted to rest normally in a predetermined static position, two sparking terminals in said circuit one on each side of said static position, and so located that the pointer may be moved into sparking relation with either, and means whereby said terminals may be electrified alternately, whereby the electrostatic field of force between the electrified terminal and pointer is adapted to increase the sensitivity of the pointer-moving mechanism to displacement forces.

19. In a control circuit for an electrical relay, an electrically conductive indicating pointer connected in said control circuit and arranged to be actuated by the varying conditions that are to operate the relay, said pointer being adjusted to rest normally in a predetermined static position, two electrical terminals in said circuit one on each side of said static position, and so located that the pointer may be moved into sparking relation with either, means whereby said terminals may be electrified alternately, whereby the electrostatic field of force between the electrified terminal and pointer is adapted to increase the sensitivity of the pointer-moving mechanism to displacement forces, and means for shielding the electrostatic field about said terminals and pointer to stabilize the pointer at its static position.

20. In a control circuit for an electrical relay, an electrically conductive indicating pointer connected in said control circuit and arranged to be actuated by the varying conditions that are to operate the relay, said pointer being adjusted to rest normally in a predetermined static position, two electrical terminals adjustably mounted in said circuit one on each side of said static position, and so located that the pointer may be moved into sparking relation with either, means whereby said terminals may be electrified alternately, whereby the electrostatic field of force between the electrified terminal and pointer is adapted to increase the sensitivity of the pointer-moving mechanism to displacement forces, and adjustable means for shielding the electrostatic field about said terminals and pointer to stabilize the pointer at its static position.

21. An electrical relay comprising in combination with a work circuit including a translating device and a gas discharge tube, a control circuit coupled with said work circuit, said control circuit including a pointer, and a sparking terminal so located with respect to the pointer end that said end may be moved into sparking relation therewith to impress an electric surge on said work circuit to discharge said tube.

22. An electrical relay comprising in combination with a work circuit including a translating device and a gas discharge tube, a control circuit coupled with said work circuit, said control circuit including a pointer, a sparking terminal so located with respect to the pointer end that said end may be moved into sparking relation therewith to impress an electric surge on said work circuit to discharge said tube, and means for shielding the electrostatic field of said terminal to stabilize said pointer in its static position.

23. An electrical relay comprising in combination with a work circuit including a translating device and a gas discharge tube, a control circuit coupled with said work circuit, said control circuit including a pointer, a sparking terminal so located with respect to the pointer end that said end may be moved into sparking relation therewith to impress an electric surge on said work circuit to discharge said tube, and adjustable means for shielding the electrostatic field of said terminal to stabilize said pointer in its static position.

24. An electrical relay comprising in combination with a work circuit including a relay coil and a gas discharge tube, a control circuit coupled with said work circuit, said control circuit including a pointer arranged to rest in a mean zero or static position, a pair of sparking terminals arranged one on each side of said static position and so located with respect to the pointer end that said end may be moved into sparking relation with either of said terminals to impress an electric surge on said work circuit to discharge said tube, and a switch operated by said relay coil alternately to connect said sparking terminals in said control circuit.

25. An electrical relay comprising in combination with a work circuit including a relay coil and a gas discharge tube, a control circuit coupled with said work circuit, said control circuit including a pointer arranged to rest in a mean zero or static position, a pair of sparking terminals arranged one on each side of said static position and so located with respect to the pointer end that said end may be moved into sparking relation with either of said terminals to impress an electric surge on said work circuit to discharge said tube, a switch operated by said relay coil alternately to connect said sparking terminals in said control circuit, and means for shielding the electrostatic fields of said terminals when electrified to stabilize said pointer in its static position.

26. An electrical relay comprising in combination with a work circuit including a relay coil and a gas discharge tube, a control circuit coupled with said work circuit, said control circuit including a pointer arranged to rest in mean zero or static position, a pair of sparking terminals arranged one on each side of said static position and so located with respect to the pointer end that said end may be moved into sparking relation with either of said terminals to impress an electric surge on said work circuit to discharge said tube, a switch operated by said relay coil alternately to connect said sparking terminals in said control circuit, and adjustable means for shielding the electrostatic field of said terminals when electrified to stabilize said pointer in its static position.

27. An electrical relay comprising in combination with a work circuit including a translating device and a gas discharge tube, a control circuit coupled with said work circuit, said control circuit including a pointer, an adjustably mounted sparking terminal so located with respect to the pointer end that said end may be moved into sparking relation therewith to impress an electric surge on said work circuit to discharge said tube, and means for shielding the electrostatic field of said terminal to stabilize said pointer in its static position.

28. An electrical relay comprising in combination with a work circuit including a translating device and a gas discharge tube, a control circuit coupled with said work circuit, said control circuit including a pointer, an adjustably mounted sparking terminal so located with respect to the pointer end that said end may be moved into sparking relation therewith to impress an electric surge on said work circuit to discharge said tube, and adjustable means for shielding the electrostatic field of said terminal to stabilize said pointer in its static position.

29. An electrical relay comprising in combination with a work circuit including a relay coil and a gas discharge tube, a control circuit coupled with said work circuit, said control circuit including a pointer arranged to rest in a mean zero or static position, a pair of adjustably mounted sparking terminals arranged one on each side of said static position and so located with respect to the pointer end that said end may be moved into sparking relation with either of said terminals to impress an electric surge on said work circuit to discharge said tube, and a switch operated by said relay coil alternately to connect said sparking terminals in said control circuit.

30. An electrical relay comprising in combination with a work circuit including a relay coil and a gas discharge tube, a control circuit coupled with said work circuit, said control circuit including a pointer arranged to rest in a mean zero or static position, a pair of adjustably mounted sparking terminals arranged one on each side of said static position and so located with respect to the pointer end that said end may be moved into sparking relation with either of said terminals to impress an electric surge on said work circuit to discharge said tube, a switch operated by said relay coil alternately to connect said sparking terminal in said control circuit, and means for shielding the electrostatic fields of said terminals when electrified to stabilize said pointer in its static position.

31. An electrical relay comprising in combination with a work circuit including a relay coil and a gas discharge tube, a control circuit coupled with said work circuit, said control circuit including a pointer arranged to rest in mean zero or static position, a pair of adjustably mounted sparking terminals arranged one on each side of said static position and so located with respect to the pointer end that said end may be moved into sparking relation with either of said terminals to impress an electric surge on said work circuit to discharge said tube, a switch operated by said relay coil alternately to connect said sparking terminals in said control circuit, and adjustable means for shielding the electrostatic field of said terminals when electrified to stabilize said pointer in its static position.

32. A metering instrument comprising in combination with an electrically conductive pointer, electric means for the actuation of said pointer and an electrified terminal so located with respect to said pointer that the electrostatic field about the terminal will attract the pointer and increase its sensitivity to displacement by said electrical means.

REUBEN S. TOUR.